(No Model.)
E. A. SMITH & N. H. BARTO.
DRAFT EQUALIZER.
No. 532,345. Patented Jan. 8, 1895.
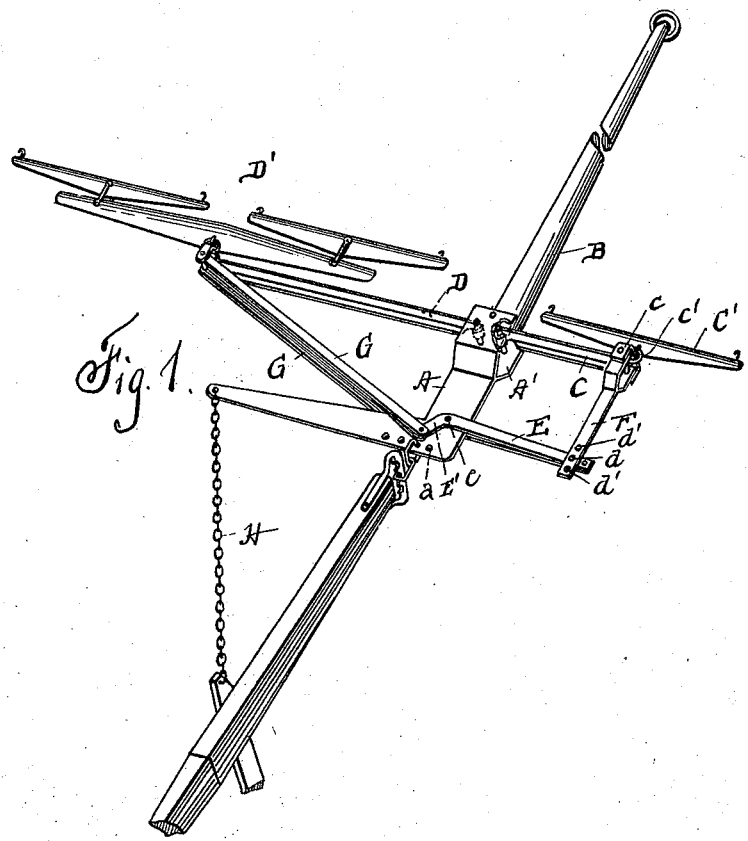
WITNESSES
Geo. M. Anderson
Philip C. Masi.
INVENTORS
E. A. Smith
N. H. Barto
by E. W. Anderson
their Attorney.

United States Patent Office.

EDWARD A. SMITH, OF GREELEY, AND NOAH H. BARTO, OF FORT COLLINS, COLORADO.

DRAFT-EQUALIZER.

SPECIFICATION forming part of Letters Patent No. 532,345, dated January 8, 1895.

Application filed June 16, 1894. Serial No. 514,820. (No model.)

*To all whom it may concern:*

Be it known that we, EDWARD A. SMITH, a resident of Greeley, county of Weld, and NOAH H. BARTO, a resident of Fort Collins, in the county of Laramie, State of Colorado, citizens of the United States, have invented certain new and useful Improvements in Pole-Eveners; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view of the invention applied. Fig. 2 is a perspective view of the equalizer.

This invention has relation to certain new and useful improvements in pole eveners or draft equalizers, the object being to provide a compound equalizing of simple construction, adapted for use with two or more horses, and having its parts so arranged that the draft is equalized in a practical and efficient manner, a pole attachment being provided whereby the evener is prevented from dropping when the tugs are slack.

With this object in view, the invention consists in the novel construction and combination of parts, all as hereinafter described, and pointed out in the appended claims.

Referring to the accompanying drawings, the letter A designates the main draft or pole frame, which consists of a right angled bar, having at its angle a series of perforations *a* by means of which it may be adjustably coupled to the plow beam for either a right or left draft. The forwardly extending arm of this frame has a bifurcated or forked portion A′ in which is pivotally held the rear end portion of a pole B, the purpose of said pole being to prevent the evener from dropping down when the tugs are slack. Pivoted in the said bifurcated portion A′ are two evener bars C and D, which extend laterally in opposite directions, the evener C being shorter than the evener D. Attached to the end portion of the evener C is a clevis *c* and ring *c′* to which is attached a single tree C′ for the furrow horse. On the outer end portion of the evener D is a similar clevis and ring to which is attached a two or three horse evener. In the drawings we have illustrated a two horse evener D′. Pivoted at *e* to the forwardly extending arm of the frame A is an equalizer E comprising two parallel bars, one above and one below, said equalizer being parallel with the evener C, and connected thereto by means of an evener rod or bar F forked at its forward end portion to embrace the outer end portion of the said evener C to which it is pivotally connected. The connection between the rear end portion of the rod or bar F and the equalizer C is made adjustable by means of a loose pin *d* and a series of holes *d′*.

G G are oblique draft rods which connect the outer end portion of the evener D with an extension E′ of the equalizer E, the connection being loose at both ends. By using two of these rods or links, one above and one below, and two of the equalizer bars E, the upward strain caused by the pull on the eveners C and D is equally divided above and below, and thereby prevents the upward bending or breaking of the said draft rods and equalizer, the two eveners pulling in a direct line with the frame.

At the extremity of the lateral arm of the frame A is attached a chain H, which extends back and is connected to the upright of the plow.

The parts are usually all made from steel, and the eveners C and D are preferably formed from L-shaped stock as shown.

Having thus described our invention, what we claim as new, and desire to secure by Letters Patent, is—

1. In a pole evener or draft equalizer of the character hereinbefore described, the combination with the angular frame A, having a forked or bifurcated portion A′, the eveners C, D, loosely held in said bifurcated portion, the double evener E having connection with the evener C, and the double draft rods G connecting the evener E with the evener D, of the forwardly extending pole B pivotally secured in said portion A, said pole being for the purpose of preventing the dropping of the evener when the tugs are slack, substantially as specified.

2. In a pole evener or draft equalizer of the character herein before described, the combination with the angular frame A, having a forked or bifurcated portion A' of a forwardly extending pole B, pivotally secured in said portion A', said pole being for the purpose of preventing the dropping of the evener when the tugs are slack, substantially as specified.

In testimony whereof we affix our signatures in presence of two witnesses.

EDWARD A. SMITH.
NOAH H. BARTO.

Witnesses for E. A. Smith:
GEORGE WILKINSON,
N. R. NORCROSS.
Witnesses for N. H. Barto:
J. F. ALDRICH,
JOHN HENGSTLER.